United States Patent [19]
Sullivan

[11] Patent Number: 5,957,538
[45] Date of Patent: Sep. 28, 1999

[54] COMBINATION BELLY AND REAR DUMP TRAILER

[76] Inventor: John L. Sullivan, P.O Box 66, Mt. Olive, Miss. 39119

[21] Appl. No.: 09/192,212

[22] Filed: Nov. 16, 1998

Related U.S. Application Data

[63] Continuation-in-part of application No. 08/827,363, Mar. 27, 1997, abandoned.

[60] Provisional application No. 60/014,204, Mar. 27, 1996.

[51] Int. Cl.$^6$ ...................................................... B60P 1/16
[52] U.S. Cl. .......................... 298/17.5; 298/22 P; 298/27; 298/35 R
[58] Field of Search ............................... 298/17.5 I, 22 P, 298/27, 33, 35 R; 105/250; 296/184

[56] References Cited

U.S. PATENT DOCUMENTS

| | | | |
|---|---|---|---|
| 2,662,780 | 12/1953 | Talbert | 298/17.5 X |
| 3,055,710 | 9/1962 | Black | 298/17.5 X |
| 3,111,346 | 11/1963 | Harbers et al. | 298/17.5 X |
| 3,158,402 | 11/1964 | Clement . | |
| 3,224,811 | 12/1965 | Horvath | 298/10 |
| 4,289,353 | 9/1981 | Merritt | 298/17.5 |
| 4,733,451 | 3/1988 | Voigt . | |
| 4,883,321 | 11/1989 | Voigt | 298/17.7 |
| 4,941,581 | 7/1990 | Searles et al. . | |
| 5,551,759 | 9/1996 | Hoss et al. | 298/22 P |

OTHER PUBLICATIONS

Tranco, American Trucker, Mar. 1997, National Insert, 1 page.
Flow Boy, American Trucker, Oct. 1997, p. SE 5.

*Primary Examiner*—Stephen T. Gordon
*Attorney, Agent, or Firm*—Shlesinger, Arkwright & Garvey LLP

[57] ABSTRACT

This invention relates to a trailer drawn by a tractor vehicle which includes the combination of a rear and belly dump and in which the trailer rear wheel assembly remains entirely on the ground when the means for elevating the trailer for rear dump is made, including means for permitting the material to be dumped to directly dump beyond the wheels of the trailer, and further, to permit the trailer wheels and the tractor wheels to be moved close together during rear dump for purposes of distribution of the material and further to include a clean-out door for dislodging material which may have been stuck during dumping operation.

21 Claims, 5 Drawing Sheets

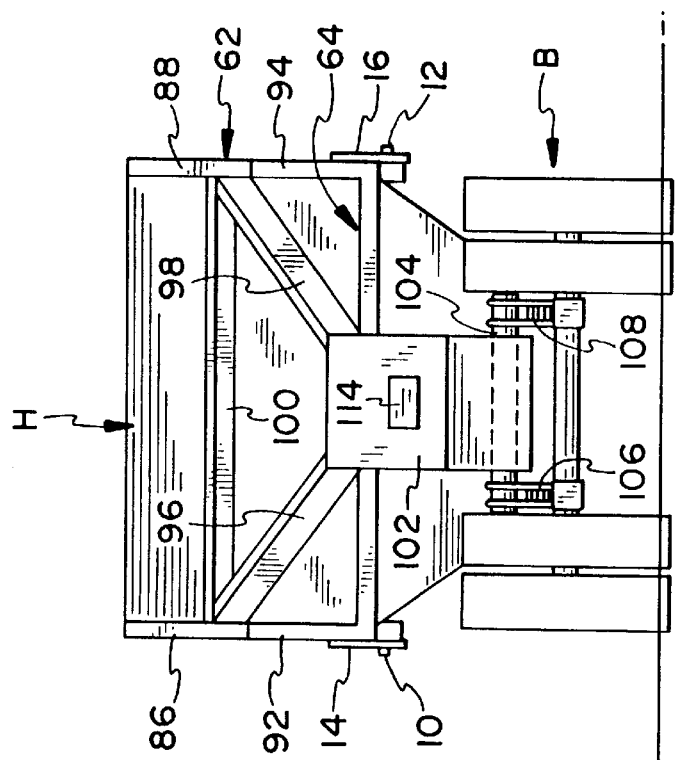
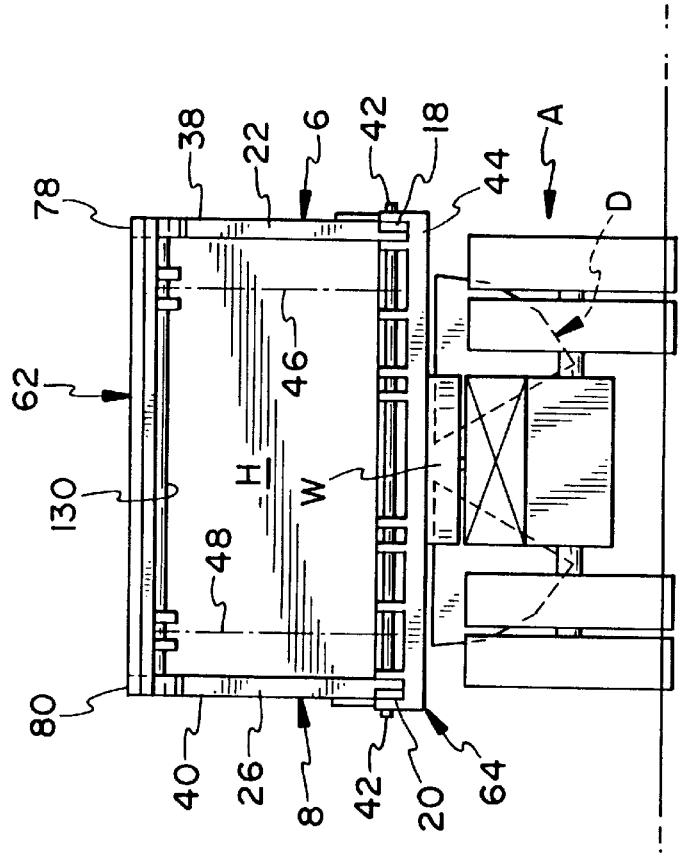
FIG. 4
FIG. 3

5,957,538

COMBINATION BELLY AND REAR DUMP TRAILER

CROSS REFERENCE TO RELATED APPLICATIONS

This application is a continuation-in-part of application Ser. No. 08/827,363 filed Mar. 27, 1997, now abandoned, which application claims the priority of Provisional Application No. 60/014,204 filed Mar. 27, 1996, likewise incorporating document disclosure No. 375,649 filed May 4, 1995, all of which are incorporated here by reference.

FIELD OF THE INVENTION

The invention relates in particular to rear and belly dump trailers.

HISTORY AND BACKGROUND OF THE INVENTION

Belly and rear dump trailers are well-known as disclosed in the early patent of Horvath U.S. Pat. No. 3,224,811 and the later developments of Merritt U.S. Pat. No. 4,289,353; Voit patents U.S. Pat. No. 4,733,451 and U.S. Pat. No. 4,883,321; Searles et al. U.S. Pat. No. 4,941,581 and Hoss et al. U.S. Pat. No. 5,551,759. Articulated vehicles having rear dump only are old in the art as shown by Clemet U.S. Pat. No. 3,158,401 and as manufactured by Flow Boy Manufacturing of Norman, Okla. as disclosed in October 1997 publication "Southeastern Region American Trucker" and disclosed in March, 1997, in "American Trucker", which shows a similar vehicle produced by Ranco of Lamar, Colo. The prior art is beset by numerous mechanical breakdowns due to structural problems such as overload on the rear axle of a dual-axle assembly, overload on the central pivot of the raising mechanism, and inability to dump from the hopper directly at the end of the vehicle beyond the wheel assembly of the trailer without an addon chute, as well as the inability to loosen stuck material in the trailer. Further, there are problems in torque which tend to cause mechanical failure at crucial parts of the trailer during dumping and trailering operations.

OBJECTS AND SUMMARY OF THE INVENTION

It is an object of this invention to provide a belly and rear dump trailer which will be simple in construction and inexpensive to manufacture.

It is another object of this invention to provide a belly and rear dump trailer which will minimize torque and prevent major breakdowns due to stress on the trailer.

Yet, a further object of this invention is to provide a rear and belly dump trailer in which the tractor wheels and the trailer wheels move closely towards each other in rear dump operation to give a smaller level windrow rather than a large pile during the initial dump operation prior to the pulling away of the tractor-trailer assembly.

Still another object of this invention is to provide means for a rear and belly dump trailer for breaking up stuck material in the hopper of the trailer such as frozen or tacky material which clumps together.

Yet another object of this invention is to provide means which will take the stress off of the central pivoting means during road travel and belly dump operations.

Another object of the invention is to provide a trailer which maintains the dual rear wheel assembly with all wheels on the ground during rear unloading operation while maintaining a center of gravity during unloading substantially over the rear wheel assembly.

In summary, this invention relates to a belly and rear dump trailer which is structurally strong during all aspects of operation as will be apparent from the following description and drawings as set out below in which:

BRIEF DESCRIPTION OF THE DRAWINGS

FIG. 3 is a front elevation of the trailer as viewed from the rear end of the tractor vehicle showing the pistons in broken lines with the belly dump shown in phantom lines in open position;

FIG. 4 is a rear elevation view of the trailer;

DESCRIPTIONS OF FIGS. 1–6

Figure 1:
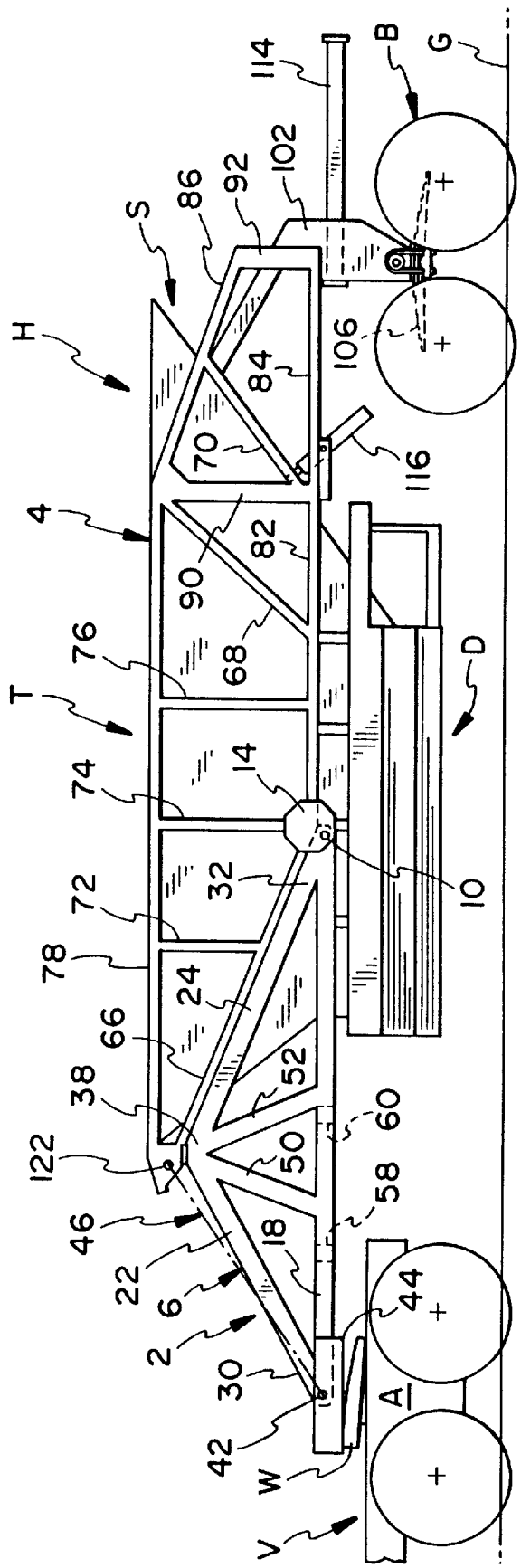
FIG. 1 is a side elevation of the trailer in belly dump position with the belly dump doors open and with the trailers secured to the fifth wheel of the rear end of the tractor vehicle.
Figure 2:
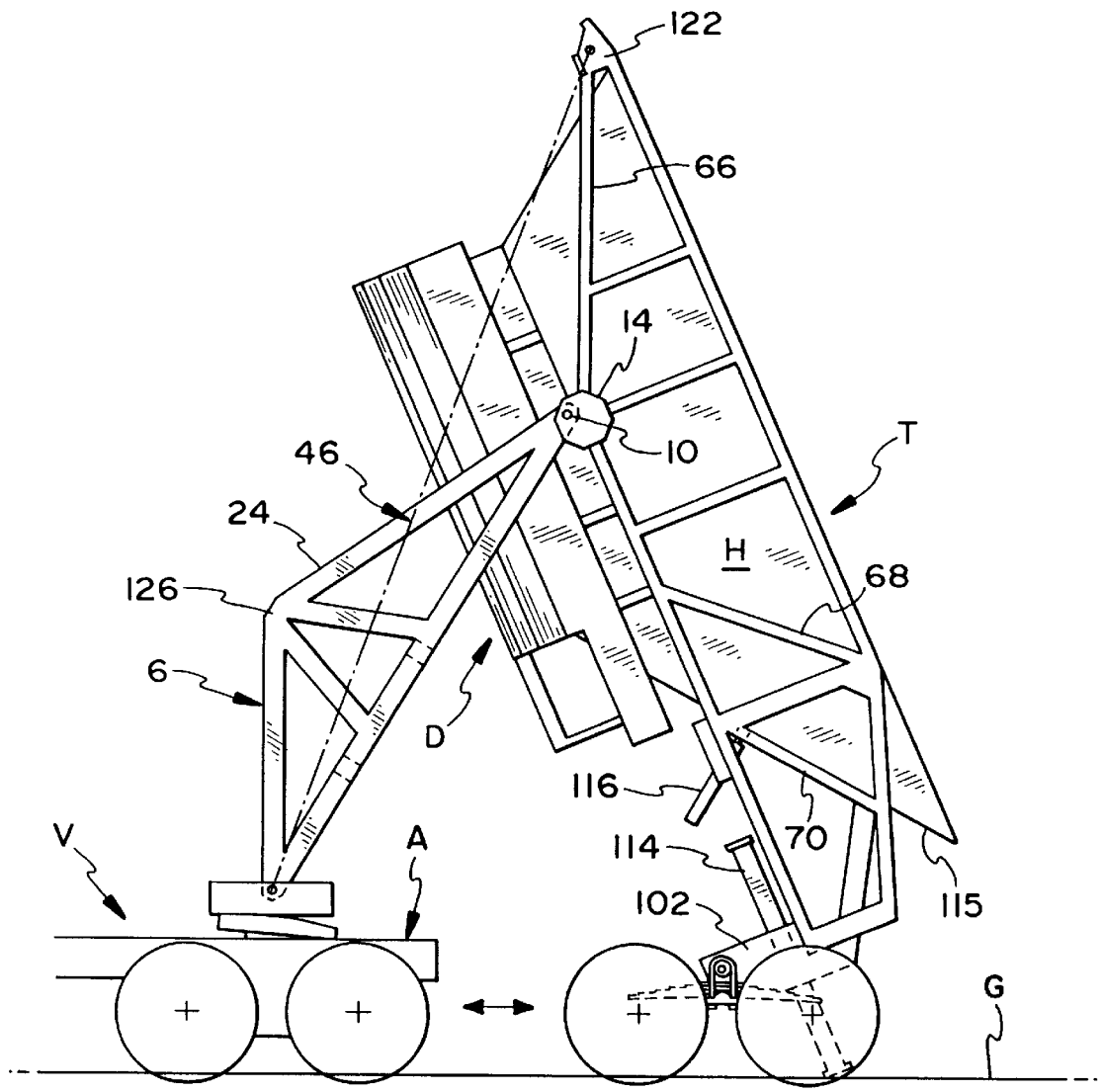
FIG. 2 is a side elevational view of the trailer in rear dump position with the belly doors closed with the trailer secured to the fifth wheel of a tractor vehicle showing only a fragment of the rear end of the tractor vehicle and also showing in broken lines the operating piston for raising and lowering the hopper of the trailer.

In FIG. 1, the trailer T is shown hooked up to a tractor vehicle V through a fifth wheel W of wheel assembly A. The trailer T is provided with a rear dual axle assembly B.

Trailer T is provided with a hopper H for carrying a load such as sand, gravel or the like. The hopper H includes a belly dump D and rear chute dump S. The hopper H is supported above the ground by a first support frame 2 and a second support frame 4. First and second support frames 2 and 4 are pivotably connected on pivot pins 10 and 12 mounted on plates on 14 and 16.

Plates 14 and 16 are secured by welding or bolts or the like (not shown) to the second support frame 4.

Triangular trusses 6 and 8 include base beams 18 and 20 and a pair of side leg beams 22, 24, 26 and 28. Side leg beams 22 and 24 extend upwardly from the front and rear ends 30 and 32 towards each other and are connected by an apex plate 38. Similarly triangular truss 8 is provided with side leg beams 26 and 28 which extend upwardly towards each other from the front and rear ends of beam 20 and are connected by an apex plate 40. A pivot pin 42 extends through fifth wheel mount 44 receiving a front ends of base beams 18 and 20 for pivoting action thereon.

Each of triangle trusses 6 and 8 have reinforcing braces 50, 52, respectively. The triangular trusses 6 and 8 are interconnected by reinforcing cross beams 58 and 60 which maintain the trusses 6 and 8 at all times in a vertical position.

Figure 5:
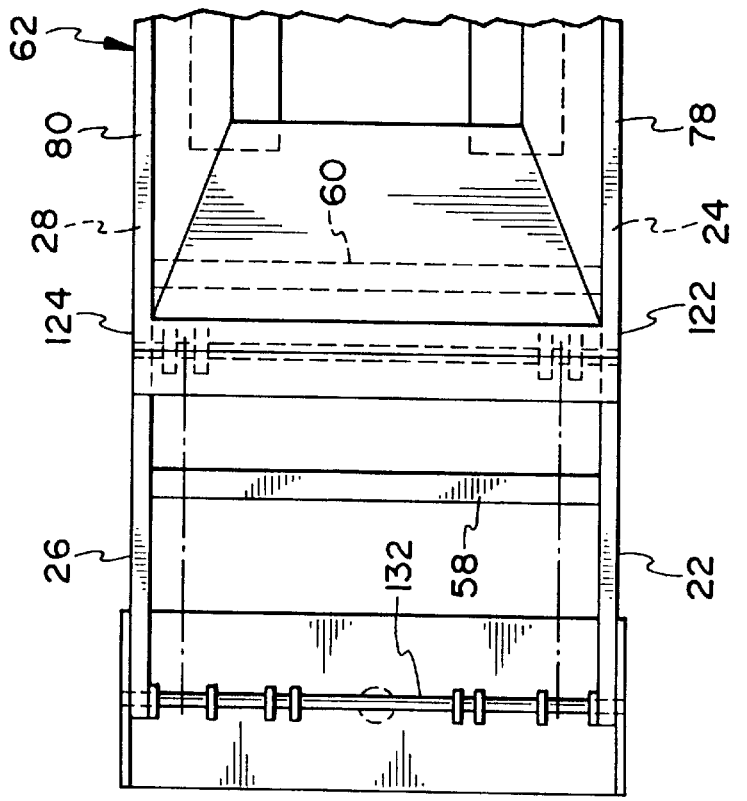
FIG. 5 is fragmentary top plan view of the front end of the tailer with pistons shown in broken lines and braces and belly dump doors shown partially in phantom lines.
Figure 7:
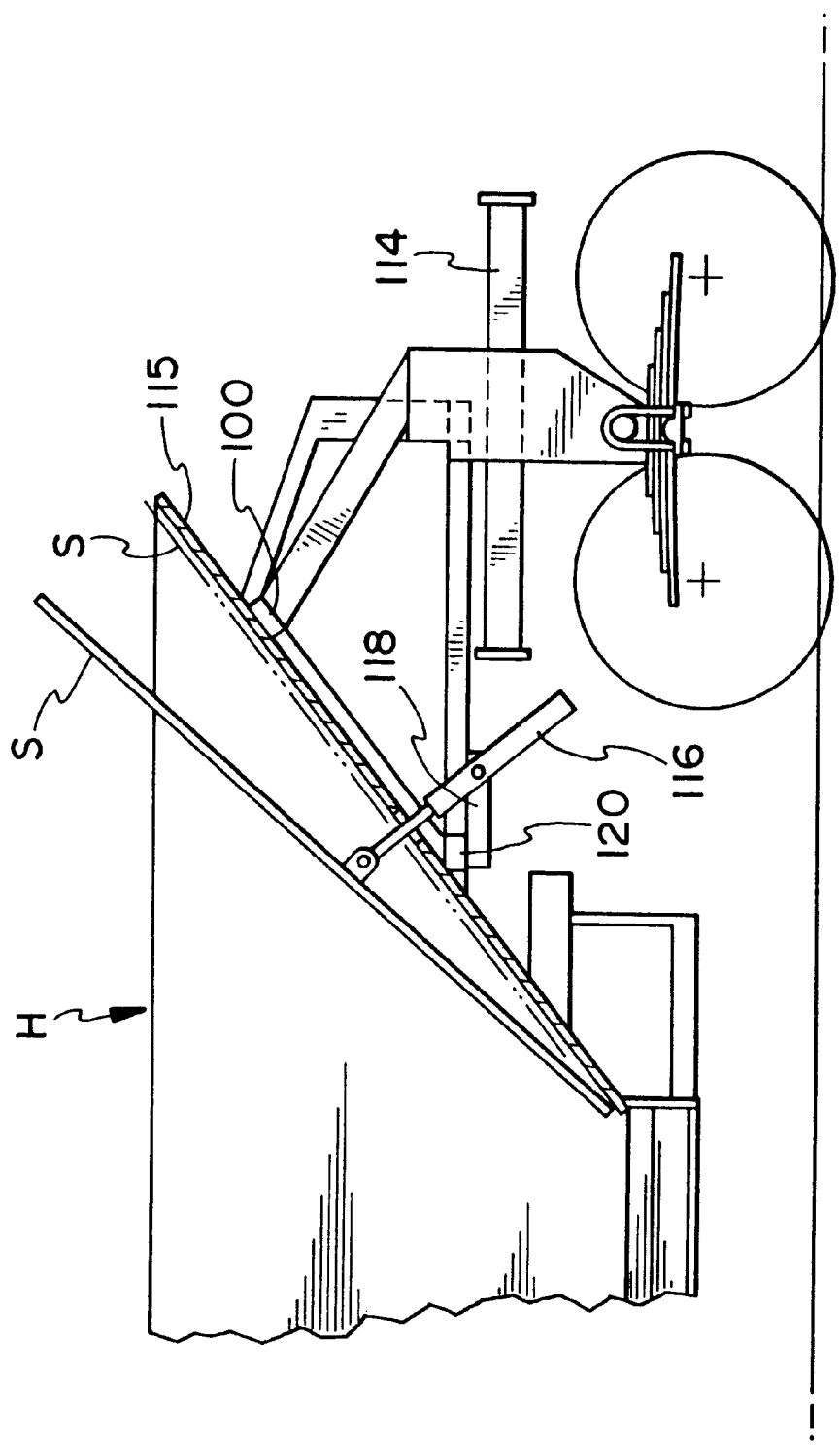
FIG. 7 is a fragmentary cross sectional view of the rear end of the trailer taken from the left side of the trailer.

Second support frame 4 includes means for supporting the hopper H including a first upper interconnected rectangular beam support 62 and a second lower rectangular beam support 64. Beam support 64 is positioned intermediate the top and bottom of the hopper H. The beam supports 62 and 64 are interconnected by diagonal braces 66, 68 and 70 as best shown on FIG. 1 on the left side of the trailer T. Similar diagonal braces (not shown in the drawing) are positioned on the right side of the trailer. Top beams 78 and 80 engage the various diagonal braces 66, 68 and 70 and the various vertical braces 72, 74 and 76 as illustrated in FIG. 1 on the left side of the trailer. Beams 78 and 80 are best shown in FIG. 5. The second lower rectangular beam support 64 includes a bottom beam 82 on the left side of the tailer T and a similar beam (not shown) on the right side of the trailer.

Figure 6:
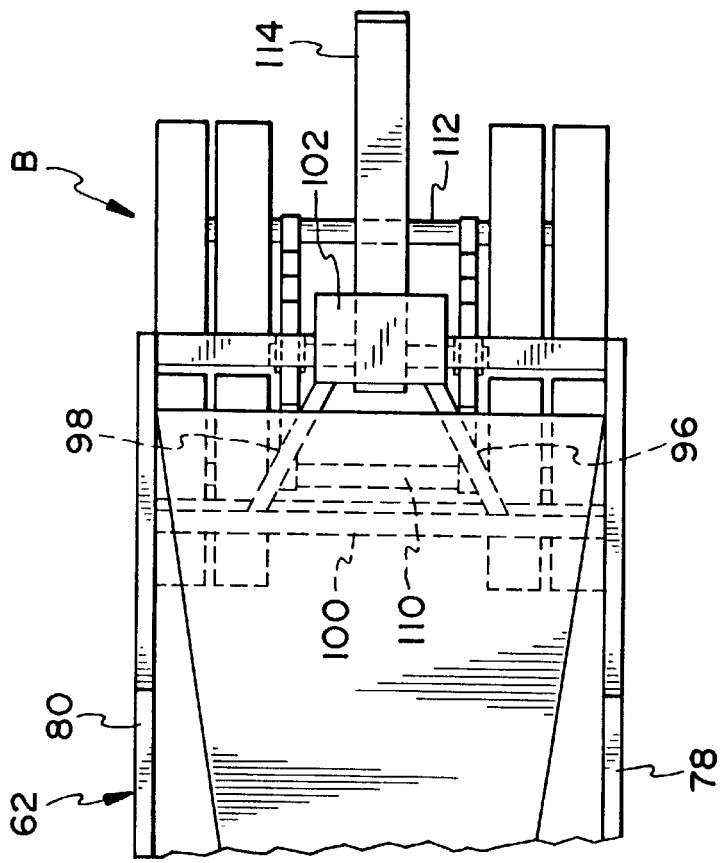
FIG. 6 is a fragmentary top plan view of the rear end of the trailer showing portion of the belly dump doors and brace supports in phantom lines.

Bottom beam 82 has a bottom beam extension 84 as shown on FIG. 1 on the left side of the trailer T. A similar extension (not shown) is provided on the right side of the trailer T. Top beams 78 and 80 are provided with top beam extensions 86 and 88, as shown in FIGS. 1 and 4. The top beam extension 86 and 88 extend downwardly and rearwardly and are connected on the left side to vertical braces 90 and 92. Similar vertical braces (not all shown) are provided on the right side of the trailer, although vertical brace 94 corresponding to vertical brace 92 can be seen on the drawings. Anti-torque braces 96 and 98, as best illustrated in FIGS. 4 and 6, are connected at the top to a cross beam 100 and at the bottom rotable box beam 102. The box beam 102 incorporates a trunion 104 about which the box beam 102 rotates independently of trunion 104 when the trailer T is elevated into a vertical position. The trunion 104 has mounted thereon replaceable bearing sleeves (not shown) and means for packing grease to provide a smooth operation of the trailer T into the vertical position during rear dump operation. The rear dual axle assembly B includes suspension springs 106 and 108 mounted on the wheel axles 110 and 112. Mounted on the box beam 102 is a telescoping push rod 114 which can be slid in and out and locked in an outward position when it is necessary to push the trailer T if it should become mired in mud.

FIG. 7

Should it become necessary to dislodge the load under sticky or ice conditions or the like, a sweep S, which is shown extended is provided on the discharge chute 115. The sweep S is mounted by piston 116 mounted on a plate 118 fixed to cross beam 120. In normal position sweep S lies against discharge chute 115.

It is obvious that various hydraulic lines will be connected to piston 116 as well as raising and lowering pistons 46 and 48.

OPERATIONS

In the operation of trailer T, the belly dump D is opened to complete unloading or partial unloading on ground G.

Trailer T is typically only moved forward as the windrow of material is distributed during end dumping. As noted in FIG. 1, side leg beam 24 and 28 will rest against diagonal brace 66 shown on the left side of the trailer and its companion on the right side of the trailer (not shown). Load supports 122 and 124 connecting top beams 78 and 80 as well as diagonal brace 66 shown on the left side of the trailer and its counter part on the right side (not shown) are supported by the apexes 126 of the triangular trusses 6 and 8.

In the rear dump position the belly doors D are closed and the pistons 46 and 48 connected to the upper pivot rod 130 and lower pivot rod 42 are extended to their full length. If the tractor brakes are set, the rear dual axle assembly B will move during dumping operation towards and in close proximity to the tractor dual axle assembly A. This will permit the load to be dumped from the end of the discharge chute 115 of the hopper H beyond the rear dual axle assembly B, and form a small level pile as the rear dual axle assembly B moves towards and in close proximity to dual axle wheel assembly A. The pistons 46 and 48 during dumping operation from the discharge chute 115 will be positioned between the triangular trusses 6 and 8. This keep the center of gravity of the raised hopper H above the rear dual axle assembly B and not exceeding the rear dual axle 112 of the dual axle assembly B to maintain the wheels of both front and rear axles 110 and 112 on the ground at all times, since the trunion 104 is positioned between the dual axles 110 and 112 of the dual axle assembly B.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A combination rear and belly dump trailer for a tractor having a rear trailer mount:

a) said trailer having a hopper having belly and rear dump chutes, b) said hopper having front, rear, top, bottom and sides, c) said hopper including first and second support frames, d) said first support frame including a pair of connected triangular trusses each including a base beam having front and rear ends and a pair of side leg beams extending upwardly from said front and rear ends of said base beams towards each other and each of said trusses including an apex member connecting its respective upwardly extending side leg beams, e) each of said triangular trusses having cross beams including a front end cross beam interconnecting said pair of trusses at said base beams, f) piston hopper raising and lowering means connected to said first support frame and to said hopper, g) said front end cross beam including a tractor-trailer mount, h) said second support frame having means for supporting said hopper including a first interconnected rectangular beam support at said top of said hopper and a second interconnected rectangular beam support intermediate said top and bottom of said hopper, i) braces extending between and connecting said first and second interconnected rectangular beam supports, j) said braces including a pair of front diagonal braces against which said side leg beams extending upwardly from said rear end of said base beams of said triangular trusses rest when said hopper is lowered, k) said first support frame pivotable with respect to said rear trailer mount, l) pivot means connected to said second interconnected rectangular beam support adjacent said diagonal braces lower ends, m) said base beams rear end connected to said pivot means and rotable thereon when said hopper is raised, n) said trailer having a dual axle rear wheel assembly including a pair of horizontal dual axles and a spring suspension mounted between said axles, o) said dual axle rear wheel assembly horizontal dual axles defining front and rear axles each having wheels, p) a trunion mounted on said spring suspension and above said axles and parallel thereto and positioned between said axles, q) a box beam mounted for rotation on said trunion and independently thereof, r) said first and second interconnected rectangular beam supports each having rearwardly extending frames connected to said box beam, s) said rearwardly extending frames being angularly disposed toward each other at said box beam, and t) said rear dump chute having a dump end and having its dump end positioned when said hopper is lowered above and in front of said trunion and above said wheels of said front axle, and when raised, having its dump end beyond the wheels of said rear axle, to permit dumping of said hopper without interference with said rear wheel axle assembly while maintaining a center of gravity, when said hopper is raised for discharge, not exceeding the rear axle of said rear axle assembly, while said rear axle assembly wheels of said front and rear axles remain on the ground with said rear dual axle wheel assembly closely approaching said tractor rear trailer mount.

2. A combination rear and belly dump trailer as in claim 1 and wherein:
a) said box beam includes a pusher mechanism.

3. A combination rear and belly dump trailer as in claim 2 and wherein:
a) said pusher mechanism is retractable.

4. A combination rear and belly dump trailer as in claim 1, and wherein:
a) said rearwardly extending frames include anti-torque means.

5. A combination rear and belly dump trailer as in claim 4, and wherein:
a) said anti-torque means includes angular inwardly extending auxiliary braces.

6. A combination rear and belly dump trailer as in claim 1, and wherein:
a) said piston raising and lowering means is connected to said hopper second support frame.

7. A combination rear and belly dump trailer as in claim 6, and wherein:
a) said piston raising and lowering means is connected to said front end cross beam.

8. A combination rear and belly dump trailer as in claim 1, and wherein:
a) said belly dump chute is positioned below said second interconnected rectangular beam support.

9. A combination rear and belly dump trailer as in claim 1, and wherein:
a) said hopper includes a sweep for dislodging stuck material.

10. A combination rear and belly dump trailer as in claim 9, and wherein:
a) said sweep is an end plate mounted at the rear of said hopper.

11. A combination rear and belly dump trailer as in claim 10, and wherein:
a) said sweep includes a piston driving mechanism.

12. A combination rear and belly dump trailer as in claim 11, and wherein:

a) said piston driving mechanism is mounted on said second interconnected rectangular beam support rearwardly extending frame.

13. A combination rear and belly dump trailer for a tractor having a rear trailer mount:
a) said trailer having a hopper having belly and rear dump chutes, b) said hopper having front, rear, top, bottom and sides and lowered and raised positions, c) said hopper including first and second support frames, d) said first support frame including a pair of connected triangular trusses, e) piston hopper raising and lowering means pivotally connected to said first support frame and to said hopper, f) said first support frame including a tractor-trailer mount, g) said second support frame having means for supporting said hopper, h) said first support frame including diagonal braces for supporting said second support frame when said second support frame is in lowered position, i) said first support frame pivotable with respect to said rear trailer mount, j) pivot means connecting said first and second support frames, k) said trailer having a dual axle rear wheel assembly including a pair of horizontal dual axles and a spring suspension mounted between said axles, l) said dual axles rear wheel assembly horizontal dual axles defining front and rear axles each having wheels, m) a trunion mounted on a said spring suspension and above said axles and parallel thereto and positioned between said axles, n) a rotable box beam mounted for rotation on said trunion, o) said second support frame having a pair of rearwardly extending frames connected to said box beam, p) said pair of rearwardly extending frames being angularly disposed toward each other at said box beam, q) said rear dump chute having a dump end and having its dump end positioned, when said hopper is lowered, above and in front of said trunion, and above said wheels of said front axle, and r) said hopper when in raised position having its rear dump chute clear of said rear axle wheels to permit dumping of said hopper without interference with said rear wheel axle assembly while maintaining a center of gravity when said hopper is raised for discharge, not exceeding the rear axle of said rear axle assembly while said rear axle assembly wheels of said front and rear axles remain on the ground with said rear dual rear axle wheel assembly closely approaching said rear trailer mount.

14. A combination rear and belly dump trailer as in claim 13 and wherein:
a) said box beam includes a pusher mechanism.

15. A combination rear and belly dump trailer as in claim 14 and wherein:
a) said pusher mechanism is retractable.

16. A combination rear and belly dump trailer as in claim 13 and wherein:
a) said pair of rearwardly extending frames include anti-torque means.

17. A combination rear and belly dump trailer as in claim 16, and wherein:
   a) said anti-torque means includes angular inwardly extending auxiliary braces.

18. A combination rear and belly dump trailer as in claim 13, and wherein:
   a) said piston raising and lowering means is connected to said hopper second support frame.

19. A combination rear and belly dump trailer as in claim 13, and wherein:
   a) said hopper includes a sweep for dislodging stuck material.

20. A combination rear and belly dump trailer as in claim 19, and wherein:
   a) said sweep is an end plate mounted at the rear of said hopper.

21. A combination rear and belly dump trailer as in claim 20, and wherein:
   a) said sweep includes a piston driving mechanism.

* * * * *